(12) United States Patent
Graham et al.

(10) Patent No.: US 11,571,743 B2
(45) Date of Patent: Feb. 7, 2023

(54) SYSTEMS AND METHODS FOR ADDITIVE MANUFACTURING

(71) Applicant: General Electric Company, Schenectady, NY (US)

(72) Inventors: Michael Evans Graham, Slingerlands, NY (US); William Monaghan, Charlton, NY (US); Thomas Charles Adcock, Glenville, NY (US); Andrew J. Martin, Blue Ash, OH (US); John Joseph Madelone, Jr., South Glens Falls, NY (US); David Charles Bogdan, Jr., Charlton, NY (US); John Broddus Deaton, Jr., Niskayuna, NY (US); William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 937 days.

(21) Appl. No.: 15/810,783

(22) Filed: Nov. 13, 2017

(65) Prior Publication Data

US 2019/0143408 A1 May 16, 2019

(51) Int. Cl.
*B22F 10/20* (2021.01)
*B22F 3/12* (2006.01)
(Continued)

(52) U.S. Cl.
CPC ............ *B22F 3/1283* (2013.01); *B22F 10/28* (2021.01); *B22F 10/47* (2021.01); *B33Y 10/00* (2014.12);
(Continued)

(58) Field of Classification Search
CPC .............................. B22F 3/1283; B22F 10/20
See application file for complete search history.

(56) References Cited

U.S. PATENT DOCUMENTS 6,932,935 B1 * 8/2005 Oberhofer .............. B33Y 10/00
264/497
7,047,098 B2 5/2006 Lindemann et al.
(Continued)

FOREIGN PATENT DOCUMENTS

WO WO2017/049156 A1 3/2017

OTHER PUBLICATIONS

Ebeling, R. "Review of finite element procedures for earth retaining structures" 1990. Department of the army. ITL-90-5. p. 1-41 (Year: 1990).*

(Continued)

*Primary Examiner* — Nicholas A Wang
(74) *Attorney, Agent, or Firm* — Dority & Manning, P.A.

(57) ABSTRACT

In one aspect, an additive manufacturing system is provided. The additive manufacturing system includes a build platform, a first plurality of particles positioned on the build platform, and a particle containment system positioned on the build platform. The particle containment system includes a particle containment wall. The particle containment wall at least partially surrounds the first plurality of particles and includes a second plurality of particles consolidated together. The particle containment wall includes a top end spaced apart from the build platform, an inner face positioned against the first plurality of particles and extending between the build platform and the top end, and an outer face that faces a substantially particle-free region, the outer face positioned opposite the inner face and extending between the build platform and the top end.

20 Claims, 5 Drawing Sheets

(51) Int. Cl.
   B33Y 10/00      (2015.01)
   B33Y 50/02      (2015.01)
   B33Y 30/00      (2015.01)
   B22F 10/28      (2021.01)
   B22F 10/47      (2021.01)
   *B22F 10/25*        (2021.01)
   *B22F 12/33*        (2021.01)
   *B22F 12/44*        (2021.01)
   *B22F 12/46*        (2021.01)
   *B22F 12/49*        (2021.01)

(52) U.S. Cl.
   CPC ............... *B33Y 30/00* (2014.12); *B33Y 50/02* (2014.12); *B22F 10/25* (2021.01); *B22F 12/33* (2021.01); *B22F 12/44* (2021.01); *B22F 12/46* (2021.01); *B22F 12/49* (2021.01)

(56) References Cited

U.S. PATENT DOCUMENTS

| | | | |
|---|---|---|---|
| 3,021,138 | A1 | 9/2011 | Green |
| 8,113,813 | B2 | 2/2012 | Yasukochi et al. |
| 9,352,413 | B2 | 5/2016 | Bruck et al. |
| 9,352,419 | B2 | 5/2016 | Bruck et al. |
| 9,505,172 | B2 | 11/2016 | Ljungblad |
| 9,522,426 | B2 | 12/2016 | Das et al. |
| 9,682,166 | B2 | 6/2017 | Watanabe |
| 9,731,450 | B2 | 8/2017 | Echigo et al. |
| 9,776,282 | B2 | 10/2017 | Subramanian et al. |
| 11,040,492 | B2 | 6/2021 | Coeck et al. |
| 2011/0252618 | A1 | 10/2011 | Diekmann et al. |
| 2011/0278773 | A1 | 11/2011 | Bokodi et al. |
| 2013/0101746 | A1* | 4/2013 | Keremes ............. B22F 10/70 427/457 |
| 2014/0099476 | A1 | 4/2014 | Subramanian et al. |
| 2014/0349132 | A1 | 11/2014 | Uhlmann et al. |
| 2015/0202686 | A1 | 7/2015 | Wimpenny et al. |
| 2015/0217370 | A1 | 8/2015 | Lemieux |
| 2015/0352786 | A1 | 12/2015 | Pruett et al. |
| 2016/0129502 | A1 | 5/2016 | Varetti |
| 2016/0297006 | A1 | 10/2016 | Buller et al. |
| 2016/0318253 | A1 | 11/2016 | Barnhart |
| 2017/0120335 | A1 | 5/2017 | Demuth et al. |
| 2017/0246810 | A1 | 8/2017 | Gold |
| 2017/0252805 | A1 | 9/2017 | Gillespie et al. |

OTHER PUBLICATIONS

International Search Report Corresponding to Application No. PCT/US2018/058086 dated Mar. 12, 2019.

* cited by examiner

SYSTEMS AND METHODS FOR ADDITIVE MANUFACTURING

BACKGROUND

The subject matter described herein relates generally to additive manufacturing systems and, more particularly, to additive manufacturing systems including powder containment systems.

At least some additive manufacturing systems involve the consolidation of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and LaserCusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) In at least some DMLM systems, a recoat device is used to recoat the component with particulate material after each build layer is scanned by the laser beam. However, in at least some known systems, the volume of particulate material required to ensure complete and consistent recoating of the component in a one-size-fits-all particulate bed can be quite large and may result in substantial particulate material waste at a substantial cost to the operator of the additive manufacturing system.

BRIEF DESCRIPTION

In one aspect, an additive manufacturing system is provided. The additive manufacturing system includes a build platform, a first plurality of particles positioned on the build platform, and a particle containment system positioned on the build platform. The particle containment system includes a particle containment wall. The particle containment wall at least partially surrounds the first plurality of particles and includes a second plurality of particles consolidated together. The particle containment wall includes a top end spaced apart from the build platform, an inner face positioned against the first plurality of particles and extending between the build platform and the top end, and an outer face that faces a substantially particle-free region, the outer face positioned opposite the inner face and extending between the build platform and the top end.

In another aspect, a controller for use in an additive manufacturing system is provided. The additive manufacturing system includes at least one consolidation device configured to consolidate at least a portion of a plurality of particles on a build platform. The controller includes a processing device and a memory device coupled to the processing device. The controller is configured to receive a build file, the build file defining a plurality of scan paths for a plurality of build layers for a particle containment system. The controller is also configured to control the consolidation device, based on the build file, to consolidate a second plurality of particles along a scan path of the plurality of scan paths to form at least a portion of the particle containment system. The particle containment system includes a particle containment wall. The particle containment wall at least partially surrounds the first plurality of particles and includes a second plurality of particles consolidated together. The particle containment wall includes a top end spaced apart from the build platform, an inner face positioned against the first plurality of particles and extending between the build platform and the top end, and an outer face that faces a substantially particle-free region, the outer face positioned opposite the inner face and extending between the build platform and the top end.

In yet another aspect, a method of fabricating a particle containment system is provided. The method includes depositing particles onto a build platform. The method also includes distributing the particles to form a build layer. The method further includes operating a consolidation device to consolidate a first plurality of particles to form a particle containment system, the particle containment system including a particle containment wall. The particle containment wall at least partially surrounds a second plurality of particles and includes a top end spaced apart from the build platform, an inner face, and an outer face. The inner face is positioned against the second plurality of particles and extends between the build platform and the top end. The outer face faces a substantially particle-free region, is positioned opposite the inner face, and extends between the build platform and the top end.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Additionally, as used herein, the term "partially surrounds" refers to a structure (e.g., a particle containment wall) being located relative to a component such that the structure is capable of substantially containing a volume of particulates located around the component. In other words, the structure may partially surround the component if the structure is sufficient to contain a volume of particulates around the component. For example, if the structure is a continuous closed shape that encloses a volume, and the component is disposed within that volume, such a structure would surround the component. Alternatively, the structure may also "partially surround" the component, as that term is used in this application, in the embodiment where the structure does not entirely surround the component. A structure substantially contains a volume of particulate around the component wherein the particulate surrounding the component is lost at a rate less than new particulate is able to be deposited.

As used herein, the term "substantially particle-free region" refers to any non-constrained portion of a build platform wherein the number of particles deposited thereon is insubstantial enough that it is not intended to be used in a build process of an additive manufacturing system. In other words, a substantially particle-free region of a build platform may contain any quantity of particles resulting from spill-over of particles from within an additively manufactured structure and not constrained by a portion of the additive manufacturing system. However, a substantially particle-free region does not contain a sufficient quantity of particles such that the particles are intended to be used in the build process of an additive manufacturing system. Specifically, a substantially particle-free region may not contain a quantity of particles intended to be consolidated by a consolidation device to form a component in an additive manufacturing system.

The systems and methods described herein include a particle containment system including a particle containment wall. The particle containment wall at least partially surrounds a first plurality of particles, wherein the particle containment wall includes a second plurality of the particles consolidated together. The particle containment wall includes a top end spaced apart from a build platform, an inner face, and an outer face. The inner face is positioned against the first plurality of the particles and extends between the build platform and the top end. The outer face faces a substantially particle-free region, is positioned opposite the inner face, and extends between the build platform and the top end. The powder containment system facilitates improving additively manufacturing particle containment walls to facilitate improving the quality of an additively manufactured component and reducing the cost to additively manufacture the component.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

Figure 1:
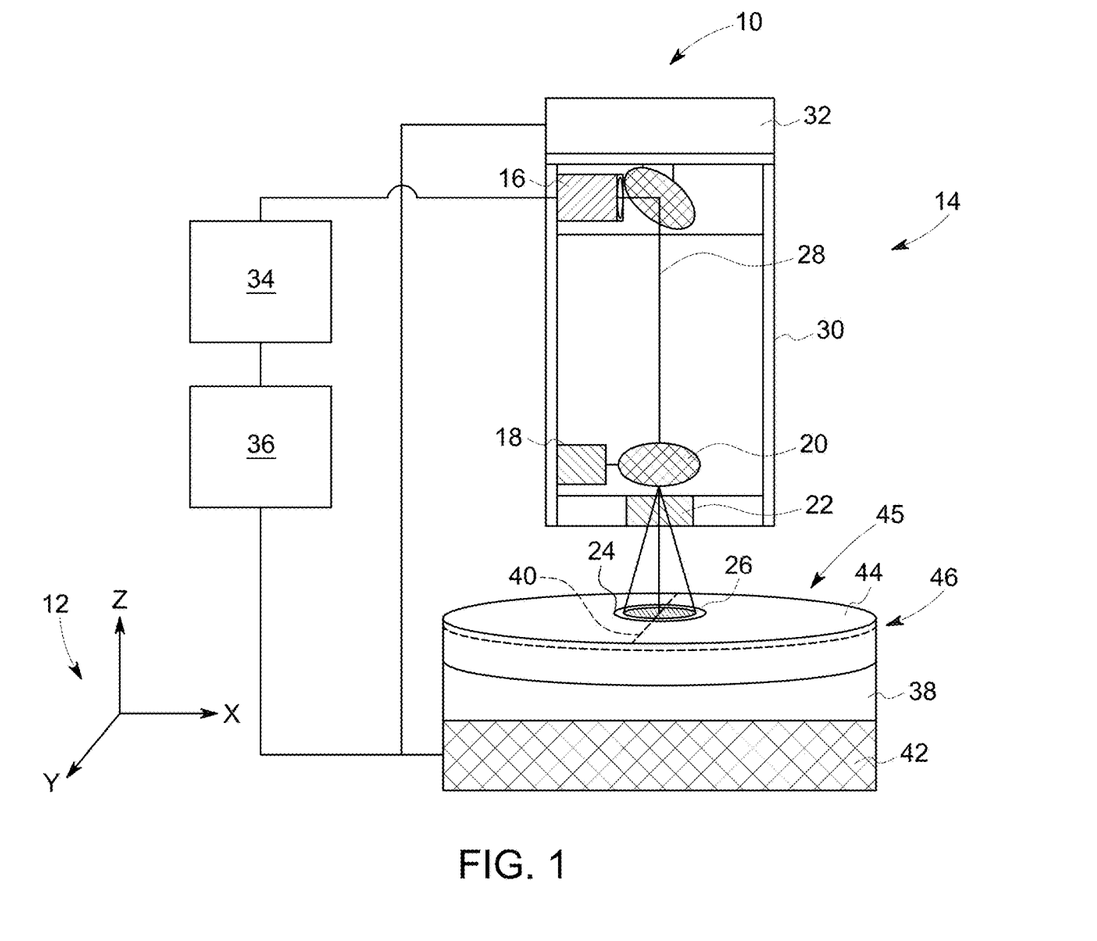
FIG. 1 is a schematic view of an exemplary additive manufacturing system.

FIG. 1 is a schematic view of an exemplary additive manufacturing system 10. A coordinate system 12 includes an X-axis, a Y-axis, and a Z-axis. In the exemplary embodiment, additive manufacturing system 10 includes a consolidation device 14 including a laser device 16, a scanning motor 18, a scanning mirror 20, and a scanning lens 22 for fabricating a component 24 using a layer-by-layer manufacturing process. Alternatively, consolidation device 14 may include any component that facilitates consolidation of a material using any of the processes and systems described herein. Laser device 16 provides a high-intensity heat source configured to generate a melt pool 26 (not shown to scale) in a powdered material using an energy beam 28. Laser device 16 is contained within a housing 30 that is coupled to a mounting system 32. Additive manufacturing system 10 also includes a computer control system, or controller 34.

Mounting system 32 is moved by an actuator or an actuator system 36 that is configured to move mounting system 32 in the X-direction, the Y-direction, and the Z-direction to cooperate with scanning mirror 20 to facilitate fabricating a layer of component 24 within additive manufacturing system 10. For example, and without limitation, mounting system 32 is pivoted about a central point, moved in a linear path, a curved path, and/or rotated to cover a portion of the powder on a build platform 38 to facilitate directing energy beam 28 along the surface of a plurality of particles 45 of a build layer 44 to form a layer of component 24 within a particle containment system 46. Alternatively, housing 30 and energy beam 28 are moved in any orientation and manner that enables additive manufacturing system 10 to function as described herein.

Scanning motor 18 is controlled by controller 34 and is configured to move mirror 20 such that energy beam 28 is reflected to be incident along a predetermined path along build platform 38, such as, for example, and without limitation, a linear and/or rotational scan path 40. In the exemplary embodiment, the combination of scanning motor 18 and scanning mirror 20 forms a two-dimension scan galvanometer. Alternatively, scanning motor 18 and scanning mirror 20 may include a three-dimension (3D) scan galvanometer, dynamic focusing galvanometer, and/or any other method that may be used to deflect energy beam 28 of laser device 16.

In the exemplary embodiment, build platform 38 is mounted to a support structure 42, which is moved by actuator system 36. As described above with respect to mounting system 32, actuator system 36 is also configured to move support structure 42 in a Z-direction (i.e., normal to a top surface of build platform 38). In some embodiments, actuator system 36 is also configured to move support structure 42 in the XY plane. For example, and without limitation, in an alternative embodiment where housing 30 is stationary, actuator system 36 moves support structure 42 in the XY plane to cooperate with scanning motor 18 and scanning mirror 20 to direct energy beam 28 of laser device 16 along scan path 40 about build platform 38. In the exemplary embodiment, actuator system 36 includes, for example, and without limitation, a linear motor(s), a hydraulic and/or pneumatic piston(s), a screw drive mechanism(s), and/or a conveyor system.

In the exemplary embodiment, additive manufacturing system 10 is operated to fabricate component 24 from a computer modeled representation of the 3D geometry of component 24. The computer modeled representation may be produced in a computer aided design (CAD) or similar file. The CAD file of component 24 is converted into a layer-by-layer format that includes a plurality of build parameters for each layer of component 24, for example, a build layer 44 of component 24 including a plurality of particles 45 to be consolidated by additive manufacturing system 10. In the exemplary embodiment, component 24 is modeled in a desired orientation relative to the origin of the coordinate system used in additive manufacturing system 10. The geometry of component 24 is sliced into a stack of layers of a desired thickness, such that the geometry of each layer is an outline of the cross-section through component 24 at that particular layer location. Scan paths 40 are generated across the geometry of a respective layer. The build parameters are applied along scan path 40 to fabricate that layer of component 24 from particles 45 used to construct component 24. The steps are repeated for each respective layer of component 24 geometry. Once the process is completed, an electronic computer build file (or files) is generated, including all of the layers. The build file is loaded into controller 34 of additive manufacturing system 10 to control the system during fabrication of each layer.

After the build file is loaded into controller 34, additive manufacturing system 10 is operated to generate component 24 by implementing the layer-by-layer manufacturing process, such as a direct metal laser melting method. The exemplary layer-by-layer additive manufacturing process does not use a pre-existing article as the precursor to the final component, rather the process produces component 24 from a raw material in a configurable form, such as particles 45. For example, and without limitation, a steel component can be additively manufactured using a steel powder. Additive manufacturing system 10 enables fabrication of components, such as component 24, using a broad range of materials, for example, and without limitation, metals, ceramics, glass, and polymers.

Figure 2:
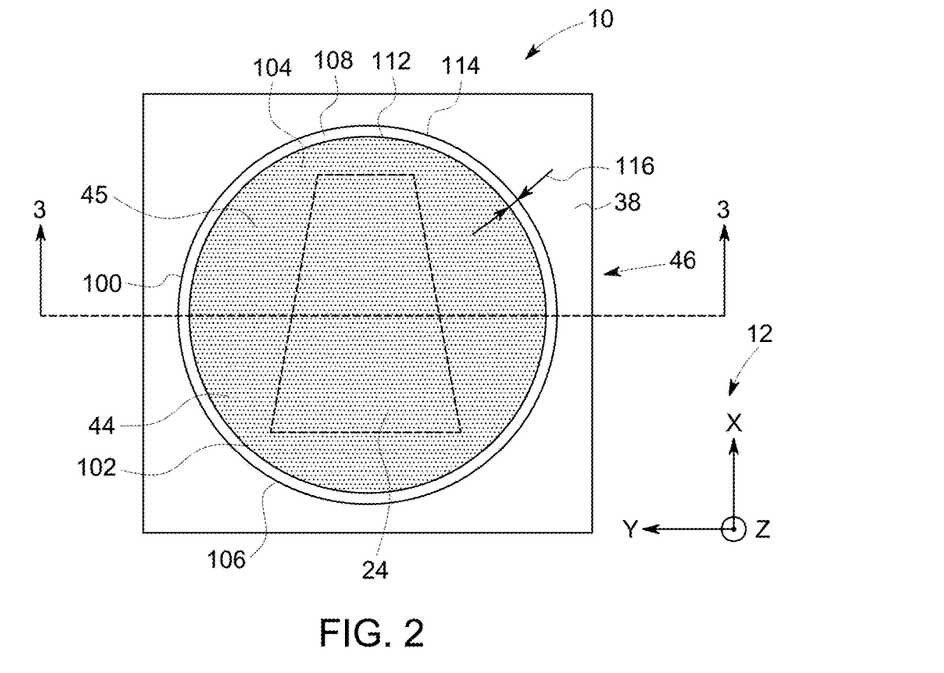
FIG. 2 is a plan schematic view of an exemplary particle containment system that may be used with the system shown in FIG. 1.
Figure 3:
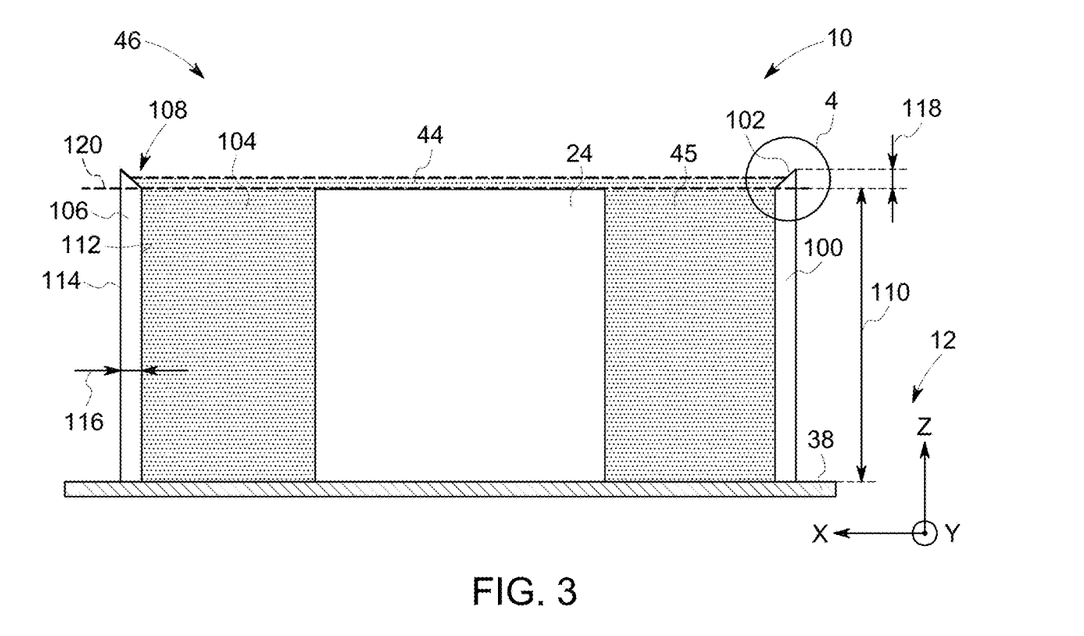
FIG. 3 is a section side schematic view of the particle containment system shown in FIG. 2.
Figure 4:
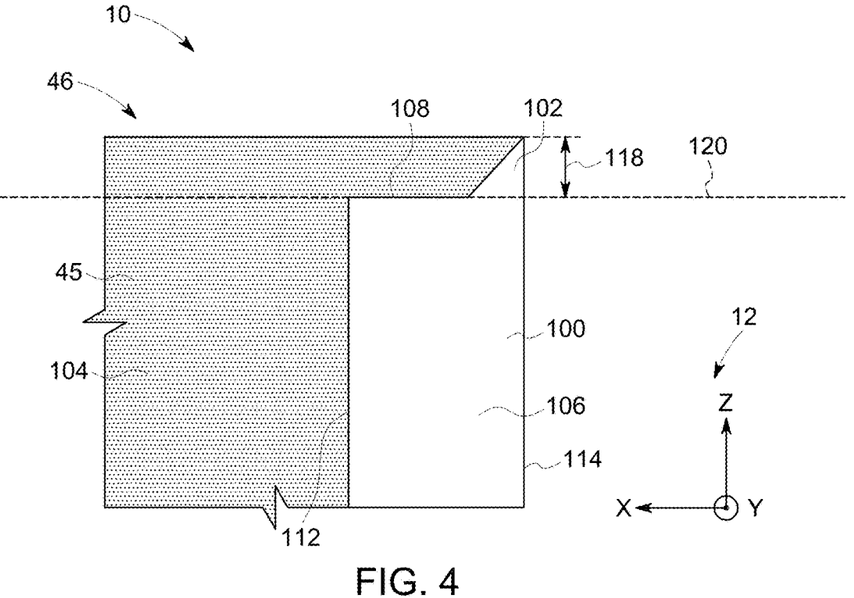
FIG. 4 is an enlarged schematic view of region 4 shown in FIG. 3 illustrating an exemplary build layer retainer that may be used with the particle containment system shown in FIG. 2.

FIG. 2 is a plan schematic view of particle containment system 46 that may be used with additive manufacturing system 10 taken along line 3-3 (shown in FIG. 1). FIG. 3 is a section side schematic view of particle containment system 46 (shown in FIG. 2). FIG. 4 is an enlarged schematic view of region 4 (shown in FIG. 3) illustrating an exemplary build layer retainer 102 that may be used with particle containment system 46 (shown in FIG. 2). In the exemplary embodiment, particle containment system 46 is configured to facilitate retaining particles 45 around component 24 to reduce the quantity of particles 45 required for operation of additive manufacturing system 10 and to facilitate improving the quality of component 24. The shape and arrangement of build platform 38, a first plurality 104 of particles 45, and particle containment system 46 are merely examples, and those of skill in the art will appreciate that build platform 38, first plurality 104 of particles 45, and particle containment system 46 may have any configuration that enables additive manufacturing system 10 to function as described herein.

In the exemplary embodiment, first plurality 104 of particles 45 are positioned on build platform 38 surrounding component 24. Particle containment system 46 is positioned on build platform 38 and includes a particle containment wall 100 at least partially surrounding particles 45, and a build layer retainer 102 extending from a top end 108 of particle containment wall 100. In an alternative embodiment, particle containment system 46 may not include build layer retainer 102. In the exemplary embodiment, particle containment wall 100 and build layer retainer 102 are generally circular and fully surround particles 45. In alternative embodiments, particle containment wall 100 and build layer retainer 102 may be any shape that facilitates operation of particle containment system 46 as described herein. In other alternative embodiments, particle containment wall 100 may surround a portion of particles 45 and may be coupled to any other wall or component that facilitates operation of additive manufacturing system 10 as described herein.

In the exemplary embodiment, particle containment wall 100 includes a second plurality 106 of particles 45 that have been joined together as part of the consolidation process described herein. Particle containment wall 100 extends along the Z-direction between build platform 38 and top end 108 by a height 110. Particle containment wall 100 extends in an XY plane between an inner face 112 and an outer face 114 by a thickness 116. Inner face 112 is positioned against first plurality 104 of particles 45, and outer face 114 faces a substantially particle-free region and is positioned opposite inner face 112 and first plurality 104 of particles 45. Build layer retainer 102 extends along the Z-direction by an extension height 118, substantially perpendicular to build platform 38. Inner face 112 extends between build platform 38 and top end 108, and outer face 114 extends between build platform 38 and top end 108. In alternative embodiments, at least one of inner face 112 and outer face 114 is one of convex shaped and concave shaped. In further alternative embodiments, particle containment wall 100 may be tapered between build platform 38 and top end 108 such that thickness 116 of a first portion of particle containment wall 100 is greater than thickness 116 of a second portion of particle containment wall 100.

In the exemplary embodiment, build layer retainer 102 is configured to retain a plurality of particles 45 against top end 108. More specifically, build layer retainer 102 extends from top end 108 along the Z-direction substantially orthogonal to a plane 120 defined by top end 108 and facilitates retaining at least a portion of build layer 44 within particle containment system 46 and overlying top end 108 to facilitate improving the formation of particle containment system 46 and component 24. In the exemplary embodiment, build layer retainer 102 extends from a radially outward portion of particle containment wall 100. In alternative embodiments, build layer retainer 102 may extend from any portion of particle containment wall 100 in any manner that facilitates operation of particle containment system 46 as described herein.

In the exemplary embodiment, particle containment wall 100 is substantially solid and is fabricated using a consolidation process using a consolidation device, such as consolidation device 14. In an alternative embodiment, particle containment wall 100 is not solid, but is configured to prevent first plurality 104 of particles 45 from passing through particle containment wall 100. In further alternative embodiments, particle containment wall 100 has a substantially corrugated structure to facilitate resisting deformation of particle containment wall. In the exemplary embodiment, consolidation device 14 includes laser device 16 that is configured to emit energy beam 28. In the exemplary embodiment, particle containment wall 100 thickness 116 is approximately equal to a width of energy beam 28 emitted by laser device 16 that is incident on second plurality 106 of particles 45. In alternative embodiments, particle containment wall 100 may have any thickness that facilitates operation of particle containment wall 100 as described herein. In other alternative embodiments, particle containment wall 100 may be fabricated using any process that facilitates operation of particle containment wall 100 as described herein.

Figure 5:
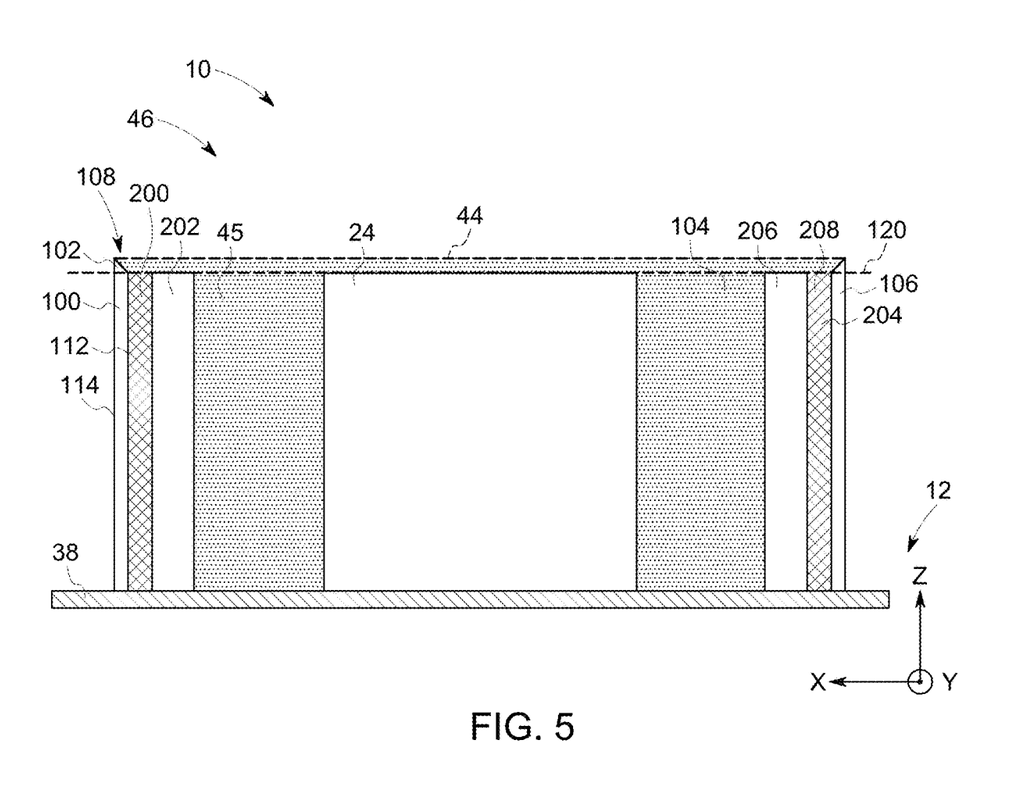
FIG. 5 is a section side schematic view of an alternative embodiment of the powder retention system shown in FIG. 2.

FIG. 5 is a section side schematic view of build platform 38 and an alternative embodiment of particle containment system 46 (shown in FIG. 2). The embodiment shown in FIG. 5 is substantially identical to the embodiment shown in FIGS. 2-4, except particle containment system 46 additionally includes a support section 200 and a backing wall 202. In the exemplary embodiment, support section 200 extends into first plurality 104 of particles 45 from particle inner face 112 and backing wall 202 is coupled to support section 200 opposite particle containment wall 100. In alternative embodiments, support section 200 and backing wall 202 may be arranged in any manner and in any quantity that facilitates operation of particle containment system 46.

In the exemplary embodiment, support section 200 includes a third plurality 204 of particles 45 joined together by the consolidation process as described herein. Backing wall 202 is substantially solid and includes a fourth plurality 206 of particles 45 consolidated by the consolidation process as described herein. In the exemplary embodiment, support section 200 is a lattice structure coupled to particle containment wall 100 and includes a plurality of unit cells 208 having a cubic shape. In alternative embodiments, unit cells 208 may have at least one of a triclinic, a monoclinic, an orthorhombic, a tetragonal, a hexagonal, and a spherical shape. In a further alternative embodiment, particle containment wall 100, support section 200, and backing wall 202 include removable portions configured to be removed to create a particulate passageway through each of particle containment wall 100, support section 200, and backing wall 202, wherein the particulate passageway extends between the first plurality 104 of particles 45 and the substantially particle-free region. The removable portions may be, for example, and not by way of limitation, breakaway tabs, wall features designed to fail under a specific load, and pry slots. In yet another alternative embodiment, support section 200 may include a wire-mesh insert. In other alternative embodiments, support section 200 and backing wall 202 may have any shape and be coupled together in any manner that facilitates operation of particle containment system 46 as described herein.

Figure 6:
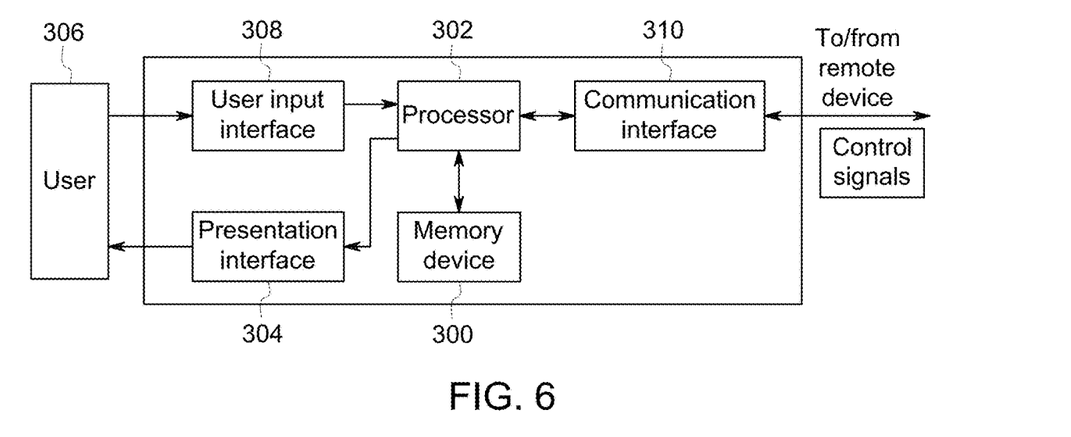
FIG. 6 is a block diagram of a controller that may be used to operate the additive manufacturing system shown in FIG. 1.

FIG. 6 is a block diagram of controller 34 that may be used to operate additive manufacturing system 10 (shown in FIG. 1). In the exemplary embodiment, controller 34 is any type of controller typically provided by a manufacturer of additive manufacturing system 10 to control operation of additive manufacturing system 10. Controller 34 executes operations to control the operation of additive manufacturing system 10 based at least partially on instructions from human operators. Controller 34 includes, for example, a 3D model of component 24 to be fabricated by additive manufacturing system 10. Operations executed by controller 34 include controlling power output of laser device 16 (shown in FIG. 1) and adjusting mounting system 32 and/or support structure 42, via actuator system 36 (all shown in FIG. 1) to control the scanning velocity of energy beam 28. Controller 34 is also configured to control scanning motor 18 to direct scanning mirror 20 to further control the scanning velocity of energy beam 28 within additive manufacturing system 10. In alternative embodiments, controller 34 may execute any operation that enables additive manufacturing system 10 to function as described herein.

In the exemplary embodiment, controller 34 includes a memory device 300 and a processor 302 coupled to memory device 300. Processor 302 may include one or more processing units, such as, without limitation, a multi-core configuration. Processor 302 is any type of processor that permits controller 34 to operate as described herein. In some embodiments, executable instructions are stored in memory device 300. Controller 34 is configurable to perform one or more operations described herein by programming processor 302. For example, processor 302 may be programmed by encoding an operation as one or more executable instructions and providing the executable instructions in memory device 300. In the exemplary embodiment, memory device 300 is one or more devices that enable storage and retrieval of information such as executable instructions or other data. Memory device 300 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 300 may be configured to store any type of data, including, without limitation, build parameters associated with component 24. In some embodiments, processor 302 removes or "purges" data from memory device 300 based on the age of the data. For example, processor 302 may overwrite previously recorded and stored data associated with a subsequent time or event. In addition, or alternatively, processor 302 may remove data that exceeds a predetermined time interval. In addition, memory device 300 includes, without limitation, sufficient data, algorithms, and commands to facilitate monitoring of build parameters and the geometric conditions of component 24 being fabricated by additive manufacturing system 10.

In some embodiments, controller 34 includes a presentation interface 304 coupled to processor 302. Presentation interface 304 presents information, such as the operating conditions of additive manufacturing system 10, to a user 306. In one embodiment, presentation interface 304 includes a display adapter (not shown) coupled to a display device (not shown), such as a cathode ray tube (CRT), a liquid crystal display (LCD), an organic LED (OLED) display, or an "electronic ink" display. In some embodiments, presentation interface 304 includes one or more display devices. In addition, or alternatively, presentation interface 304 includes an audio output device (not shown), for example, without limitation, an audio adapter or a speaker (not shown).

In some embodiments, controller 34 includes a user input interface 308. In the exemplary embodiment, user input interface 308 is coupled to processor 302 and receives input from user 306. User input interface 308 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 304 and user input interface 308.

In the exemplary embodiment, a communication interface 310 is coupled to processor 302 and is configured to be coupled in communication with one or more other devices, such as laser device 16, and to perform input and output operations with respect to such devices while performing as an input channel. For example, communication interface 310 may include, without limitation, a wired network adapter, a wireless network adapter, a mobile telecommunications adapter, a serial communication adapter, or a parallel communication adapter. Communication interface 310 may receive a data signal from or transmit a data signal to one or more remote devices. For example, in some embodiments, communication interface 310 of controller 34 may transmit/receive a data signal to/from actuator system 36.

Presentation interface 304 and communication interface 310 are both capable of providing information suitable for use with the methods described herein, such as, providing information to user 306 or processor 302. Accordingly, presentation interface 304 and communication interface 310 may be referred to as output devices. Similarly, user input interface 308 and communication interface 310 are capable of receiving information suitable for use with the methods described herein and may be referred to as input devices.

Figure 7:
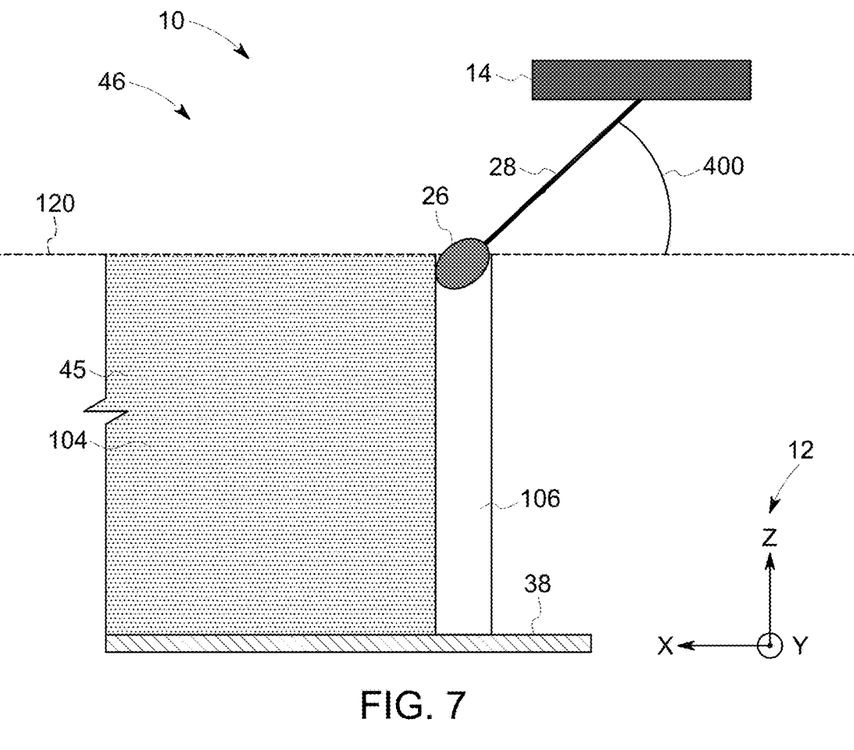
FIG. 7 is a section schematic view of a portion of the particle containment system shown in FIG. 2 illustrating an exemplary energy beam and an exemplary consolidation device.

FIG. 7 is a section schematic view of a portion of particle containment system 46 (shown in FIG. 2) illustrating an energy beam 28 and consolidation device 14 during fabrication of particle containment system 46. In the exemplary embodiment, controller 34 controls consolidation device 14, based on a build file to consolidate a second plurality 106 of particles 45 along scan path 40 to form at least a portion of particle containment system 46. In the exemplary embodiment, consolidation device 14 includes laser device 16 that is configured to emit an energy beam 28. Controller 34 is configured to direct energy beam 28 to be incident on second plurality 106 of particles 45 along scan path 40 at an angle 400 of between zero degrees and ninety degrees, relative to plane 120 defined by top end 108 of particle containment wall 100. Angle 400 is maintained between seventy-five degrees and ninety degrees during fabrication of particle containment system 46 to facilitate fabricating top end 108 and build layer retainer 102 by using melt pool surface tension effects to reduce the effects of particle 45 starvation at a radially outward portion of top end 108 during formation of particle containment system 46. In an alternative embodiment, consolidation device 14 may be controlled to direct energy beam 28 to consolidate a plurality of first plurality 104 of particles 45 along the profile of particle containment system 46.

Figure 8:
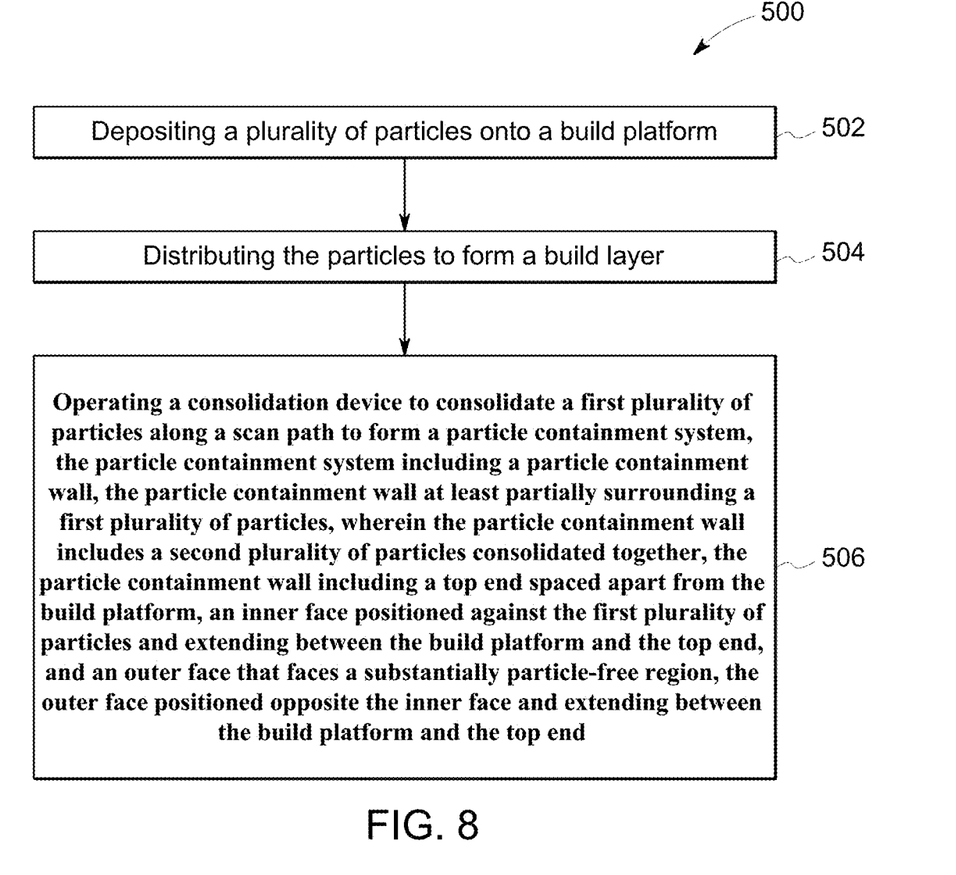
FIG. 8 is a flowchart of an exemplary method that may be used to fabricate the particle containment system shown in FIG. 2.

FIG. 8 is a flow chart illustrating a method 500 for fabricating particle containment system 46. Referring to FIGS. 1-7, method 500 includes depositing 502 a plurality of particles 45 onto a build platform 38. Method 500 also includes distributing 504 the plurality of particles 45 to form a build layer 44. Method 500 further includes operating 506 a consolidation device 14 to consolidate a first plurality 104 of particles 45 to form a particle containment system 46. The particle containment system 46 includes a particle containment wall 100 at least partially surrounding a second plurality 106 of particles 45. Particle containment wall 100 includes a top end 108 spaced apart from build platform 38, an inner face 112 positioned against second plurality 106 of particles 45 and extending between build platform 38 and top end 108, and an outer face 114 positioned opposite inner face 112 and extending between build platform 38 and top end 108. Particle containment system 46 also includes a build layer retainer 102 extending from top end 108 of particle containment wall 100.

The embodiments described herein include a particle containment system including a particle containment wall. The particle containment wall at least partially surrounds a first plurality of particles, wherein the particle containment wall includes a second plurality of the particles consolidated together. The particle containment wall includes a top end spaced apart from a build platform, an inner face, and an outer face. The inner face is positioned against the first plurality of the particles and extends between the build platform and the top end. The outer face faces a substantially particle-free region, is positioned opposite the inner face, and extends between the build platform and the top end. The powder containment system facilitates improving additively manufacturing particle containment walls to facilitate improving the quality of an additively manufactured component and reducing the cost to additively manufacture the component.

An exemplary technical effect of the methods, systems, and apparatus described herein includes at least one of: a) improving coverage of a component with particulate matter during the recoating process, b) reducing the amount of particulate matter required for additively manufacturing a component, c) improving particle containment wall construction, and d) reducing the cost of additively manufacturing a component.

Exemplary embodiments of particle containment systems that include particle containment walls and build layer retainers are described above in detail. The particle containment systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
a build platform;
a first plurality of particles positioned on said build platform; and
a particle containment system positioned on said build platform, said particle containment system comprising:
a particle containment wall at least partially surrounding said first plurality of particles, wherein said particle containment wall comprises a second plurality of particles consolidated together, said particle containment wall comprising:
a top end spaced apart from said build platform;
an inner face positioned against said first plurality of particles and extending between said build platform and said top end;
an outer face that faces a substantially particle-free region, said outer face positioned opposite said inner face and extending between said build platform and said top end; and
a build layer retainer comprising particles consolidated together to extend from said top end of said particle containment wall along a direction substantially orthogonal to a plane defined by said top end,
wherein said build layer retainer is configured to retain at least a portion of a build layer comprising a plurality of said first plurality of particles,
wherein the build layer retainer extends a first distance along the direction substantially orthogonal to the plane defined by the top end of the particle containment wall from a first point on the top end of the particle containment wall to a top surface of the build layer retainer, the first point being radially outward on the top end of the particle containment wall relatively farther from the first plurality of particles contained by the particle containment wall,
wherein the build layer retainer extends a second distance along the direction substantially orthogonal to the plane defined by the top end of the particle containment wall from a second point on the top end of the particle containment wall to the top surface of the build layer retainer, the second point being radially inward on the top end of the particle containment wall relatively closer to the first plurality of particles contained by the particle containment wall, and
wherein the first distance is greater than the second distance.

2. The additive manufacturing system of claim 1, wherein said particle containment wall is one of solid and corrugated.

3. The additive manufacturing system of claim 1, wherein said particle containment system further comprises at least one support section extending into said first plurality of particles from at least a portion of said particle containment wall inner face, and wherein said at least one support section comprises a third plurality of particles consolidated together.

4. The additive manufacturing system of claim 3, wherein said support section is one of a solid structure and a lattice structure comprising a plurality of unit cells.

5. The additive manufacturing system of claim 3, wherein at least one of said inner face or said outer face is at least one of convex, concave, or oriented substantially perpendicular to said build platform.

6. The additive manufacturing system of claim 3, wherein said particle containment system further comprises at least one backing wall coupled to said at least one support section opposite said particle containment wall, and wherein said at least one backing wall comprises a fourth plurality of particles consolidated together.

7. The additive manufacturing system of claim 1, wherein said particle containment system further comprises a removable section, wherein said removable section is configured to be removed from said particle containment system to create a particulate passageway through said particle containment system, wherein said particulate passageway extends between said first plurality of particles and the substantially particle-free region.

8. The additive manufacturing system of claim 1, wherein the build layer retainer extends from a radially outward portion of the particle containment wall.

9. The additive manufacturing system of claim 1, wherein the particle containment wall defines a first thickness between the inner face and the outer face, and wherein the build layer retainer defines a second thickness different than the first thickness.

10. The additive manufacturing system of claim 1, wherein at least a portion of the build layer retainer extends beyond the build layer along the direction substantially orthogonal to the plane defined by the top end of the particle containment wall.

11. A controller for use in an additive manufacturing system including at least one consolidation device, the at least one consolidation device configured to consolidate at least a portion of a plurality of particles on a build platform, said controller including a processing device and a memory device coupled to said processing device, said controller configured to:
receive a build file, the build file defining a plurality of scan paths for a plurality of build layers for a particle containment system;
control the consolidation device, based on the build file, to consolidate a second plurality of particles along a scan path of the plurality of scan paths to form at least a portion of the particle containment system, wherein the particle containment system includes:
a particle containment wall at least partially surrounding a first plurality of particles, wherein the particle containment wall includes a second plurality of particles consolidated together, the particle containment wall including:
a top end spaced apart from the build platform;
an inner face positioned against the first plurality of particles and extending between the build platform and the top end;
an outer face that faces a substantially particle-free region, the outer face positioned opposite the inner face and extending between the build platform and the top end; and
a build layer retainer comprising particles consolidated together to extend from said top end of said particle containment wall along a direction substantially orthogonal to a plane defined by said top end,
wherein said build layer retainer is configured to retain at least a portion of a build layer comprising a plurality of said first plurality of particles,
wherein the build layer retainer extends a first distance along the direction substantially orthogonal to the plane defined by the top end of the particle containment wall from a first point on the top end of the particle containment wall to a top surface of the build layer retainer, the first point being radially outward on the top end of the particle containment wall relatively farther from the first plurality of particles contained by the particle containment wall,
wherein the build layer retainer extends a second distance along the direction substantially orthogonal to the plane defined by the top end of the particle containment wall from a second point on the top end of the particle containment wall to the top surface of the build layer retainer, the second point being radially inward on the top end of the particle containment wall relatively closer to the first plurality of particles contained by the particle containment wall, and
wherein the first distance is greater than the second distance.

12. The controller in accordance with claim 11, wherein said controller is configured to control a consolidation device including a laser device configured to emit an energy beam, and wherein said controller is further configured to direct the energy beam to be incident on the second plurality of particles along the scan path at an angle of between approximately zero degrees and ninety degrees relative to a plane defined by the top end of the particle containment wall.

13. The controller in accordance with claim 11, wherein said controller is configured to control the consolidation device to form a particle containment wall that is one of solid and corrugated.

14. The controller in accordance with claim 11, wherein said controller is configured to control the consolidation device to form at least one support section extending into the second plurality of particles from at least a portion of the particle containment wall inner face, and wherein the at least one support section includes a third plurality of particles consolidated together.

15. The controller in accordance with claim 14, wherein said controller is configured to control the consolidation device to form the at least one support section, and wherein the at least one support section includes one of a solid structure and a lattice structure including a plurality of unit cells.

16. A method of fabricating a component, said method comprising:
depositing particles onto a build platform;
distributing the particles to form a build layer;
operating a consolidation device to consolidate a first plurality of particles along a scan path to form a particle containment system, the particle containment system including:
a particle containment wall at least partially surrounding a first plurality of particles, wherein the particle containment wall includes a second plurality of particles consolidated together, the particle containment wall including:
a top end spaced apart from the build platform;
an inner face positioned against the first plurality of particles and extending between the build platform and the top end;

an outer face that faces a substantially particle-free region, the outer face positioned opposite the inner face and extending between the build platform and the top end; and a build layer retainer comprising particles consolidated together to extend from said top end of said particle containment wall along a direction substantially orthogonal to a plane defined by said top end, wherein said build layer retainer is configured to retain at least a portion of a build layer comprising a plurality of said first plurality of particles, wherein the build layer retainer extends a first distance along the direction substantially orthogonal to the plane defined by the top end of the particle containment wall from a first point on the top end of the particle containment wall to a top surface of the build layer retainer, the first point being radially outward on the top end of the particle containment wall relatively farther from the first plurality of particles contained by the particle containment wall, wherein the build layer retainer extends a second distance along the direction substantially orthogonal to the plane defined by the top end of the particle containment wall from a second point on the top end of the particle containment wall to the top surface of the build layer retainer, the second point being radially inward on the top end of the particle containment wall relatively closer to the first plurality of particles contained by the particle containment wall, and wherein the first distance is greater than the second distance.

17. The method in accordance with claim 16, wherein operating the consolidation device further includes directing an energy beam to be incident on the second plurality of particles along the scan path at an angle of between approximately zero degrees and ninety degrees relative to a plane defined by the top end of the particle containment wall.

18. The method in accordance with claim 16, wherein operating the consolidation device includes operating the consolidation device to form at least one support section extending into the second plurality of particles from at least a portion of the particle containment wall inner face, and wherein the at least one support section includes a third plurality of particles consolidated together.

19. The method in accordance with claim 18, wherein operating the consolidation device to form at least one support section includes forming a support section that is one of a solid structure and a lattice structure comprising a plurality of unit cells.

20. The method in accordance with claim 16, wherein operating the consolidation device includes operating the consolidation device to form a particle containment wall that is one of substantially solid and substantially corrugated.

* * * * *